(12) United States Patent
Ciurea

(10) Patent No.: US 8,918,334 B2
(45) Date of Patent: *Dec. 23, 2014

(54) CAMERA AS A VEHICLE TO IDENTIFY A MERCHANT ACCESS DEVICE

(71) Applicant: Visa International Service Association, San Francisco, CA (US)

(72) Inventor: Peter Ciurea, Orinda, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/720,781

(22) Filed: Dec. 19, 2012

(65) Prior Publication Data

US 2013/0117184 A1 May 9, 2013

Related U.S. Application Data

(63) Continuation of application No. 13/051,837, filed on Mar. 18, 2011, now Pat. No. 8,364,552.

(60) Provisional application No. 61/323,655, filed on Apr. 13, 2010.

(51) Int. Cl.
*G06Q 30/00* (2012.01)

(52) U.S. Cl.
USPC ........... 705/26.1; 705/26.41; 705/44; 705/75; 455/404.2; 455/456.1

(58) Field of Classification Search
USPC ............... 705/26.1, 26.41, 44, 75; 455/404.2, 455/456.1
See application file for complete search history.

(56) References Cited

U.S. PATENT DOCUMENTS

| | | | |
|---|---|---|---|
| 8,239,286 B2 * | 8/2012 | Davis et al. .................. | 705/26.7 |
| 8,364,552 B2 | 1/2013 | Ciurea | |
| 2005/0071671 A1 | 3/2005 | Karaoguz | |
| 2005/0162523 A1 | 7/2005 | Darrell et al. | |
| 2008/0268876 A1 | 10/2008 | Gelfand et al. | |
| 2009/0112766 A1 | 4/2009 | Hammad et al. | |
| 2009/0240626 A1 | 9/2009 | Hasson et al. | |
| 2010/0008535 A1 | 1/2010 | Abulafia et al. | |
| 2010/0049626 A1 | 2/2010 | Hong et al. | |
| 2011/0087592 A1 | 4/2011 | van der Veen et al. | |
| 2011/0169692 A1 | 7/2011 | Macfarlane et al. | |
| 2012/0322403 A1* | 12/2012 | Craine et al. ............... | 455/404.2 |

FOREIGN PATENT DOCUMENTS

| | | |
|---|---|---|
| KR | 10-2005-0098427 A | 10/2005 |
| KR | 10-2007-0089777 A | 9/2007 |
| KR | 10-2008-0043048 A | 5/2008 |

OTHER PUBLICATIONS

International Search Report and Written Opinion of PCT Application No. PCT/US2011/032183, dated Dec. 13, 2011, 10 pgs.

\* cited by examiner

*Primary Examiner* — Yogesh C Garg
(74) *Attorney, Agent, or Firm* — Kilpatrick, Townsend & Stockton LLP

(57) ABSTRACT

Systems and methods of conducting a payment transaction using a mobile phone having a camera. The systems and methods receive an image of a merchant access device and optionally location data from a mobile device of a user engaged in the transaction. The systems and methods also receive transaction information associated with the transaction and account information associated with an account of the user. The systems and methods use the information to authorize or decline the transaction.

36 Claims, 8 Drawing Sheets

US 8,918,334 B2

CAMERA AS A VEHICLE TO IDENTIFY A MERCHANT ACCESS DEVICE

CROSS-REFERENCES TO RELATED APPLICATIONS

This patent application is a continuation of U.S. application Ser. No. 13/051,837, filed Mar. 18, 2011, which claims priority to U.S. Provisional Application No. 61/323,655 filed Apr. 13, 2010, entitled "Camera As A Vehicle To Identify Location," both of which are hereby incorporated by reference in their entirety for all purposes.

BACKGROUND

Identity theft and identity fraud have become increasingly serious problems as devices for engaging in financial transactions have increased in number. These fraudulent activities have become very costly to consumers, merchants, financial institutions, and others.

Prior systems provide various fraud deterrent techniques. For example, near field communications protocols, such as Bluetooth and RFID, allow a consumer to exchange transaction information with a merchant without physical contact between the consumer's near field communication enabled payment device and the merchant's near field communication enabled access device. The problem is that all consumers do not have payment devices that support near field communications. Thus, all consumers cannot take advantage of contactless payment mechanisms.

Embodiments of this disclosure address these and other problems, individually and collectively.

BRIEF SUMMARY

Embodiments of the present invention relate in general to financial transactions and in particular to systems and methods for using a camera as a vehicle to identify the location of a merchant access device of a merchant.

According to one embodiment, a method includes acquiring, during a transaction between a consumer and a merchant via a merchant access device associated with the merchant, an image of the merchant access device, the image including characteristics of the merchant access device, and communicating the image to a server computer. The server computer subsequently identifies the merchant access device from a plurality of merchant access devices using the characteristics of the merchant access device included in the communicated image.

According to another embodiment, a method includes receiving, during a transaction between a consumer and a merchant via a merchant access device associated with the merchant, an image of the merchant access device, the image including characteristics of the merchant access device, and identifying the merchant access device from a plurality of merchant access devices using the characteristics of the merchant access device included in the received image, and sending an authorization response message to the merchant access device. The authorization response message indicates whether or not the transaction is approved.

These and other embodiments of the invention are described in further detailed below.

DETAILED DESCRIPTION

Figure 1:
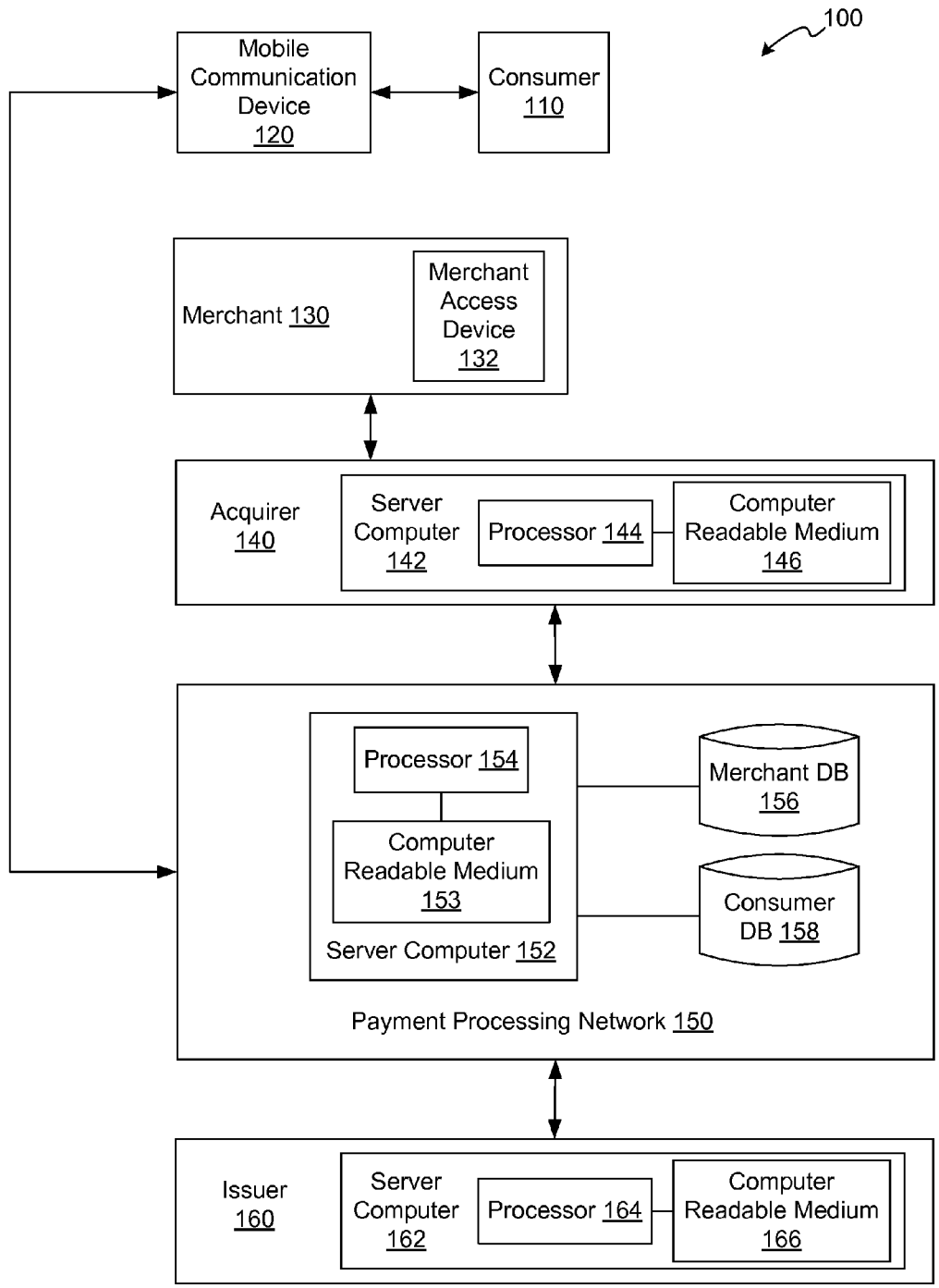
FIG. 1 is a block diagram of an exemplary system for conducting a payment transaction using a camera in a mobile communication device as a vehicle to identify a merchant access device, according to one embodiment of the invention.

Embodiments of the invention disclosed herein include systems and methods for using a camera as a vehicle to identify a merchant access device of a merchant.

A consumer may use a mobile communication device such as a cell phone to engage in a transaction with a merchant. The merchant may have a merchant access device such as a Point of Sale terminal to display transaction information and, in some cases, receive account information from the consumer. The mobile communication device in embodiments of the present invention includes a camera to process transactions with the merchant. The camera enables the consumer to engage in the transaction with the merchant without providing account information to the merchant.

Instead of providing account information to the merchant, the consumer may use the camera to acquire an image of the merchant access device. Merchant access devices typically have unique characteristics by which they can be identified. Accordingly, the image will capture such characteristics. The consumer may then send the image to a server in a payment processing network such as VisaNet via the mobile communication device. The server may then compare the image to images stored in a database in order to identify the merchant access device used. In some embodiments, the comparison may be performed by the mobile communication device. The consumer, at the same time, may also provide account information to the server via the mobile communication device. Further, the server may obtain transaction information, such as the amount of the transaction which needs to be authorized. The server may obtain the transaction information from either the consumer via the mobile communication device or from the merchant.

Once the server has acquired all of this information, the server may then use such information to determine whether the transaction is authorized, or send the information to an issuer for authorization. An authorization response message may then be returned to the consumer and merchant via mobile communication device and/or merchant access device. While the account information is used to identify an account associated with the consumer, the transaction information is used to identify the amount of the transaction which needs to be authorized, and the image is used to identify the merchant access device so that the authorization response message may be communicated to the appropriate merchant and merchant access device.

Certain embodiments of the invention may provide one or more advantages to consumers, merchants, issuers, and others. An advantage to a consumer is that his identification information is more secure. Since the consumer can communicate the transaction and identification information directly to the payment processing network through his mobile communication device, the merchant access device (e.g., point of sale terminal) no longer requires the identification information to conduct the transaction. Thus, the consumer does not need to provide his identification information to the merchant access device, which eliminates the problem of identity theft at the merchant access device. In many cases, identity theft can occur when the merchant access device is located at a fraudulent merchant or when the merchant access device itself is unauthorized, because it was placed at a legitimate merchant by an unauthorized person. Further, a direct line of communication from the consumer to the payment processing network is easier to protect and thus more secure. For example, the mobile communication device can include a secure chip with encryption software. Since the server computer of the payment processing network communicates directly with the mobile communication device, the server computer of the payment processing network can provide frequent and timely updates of encryption software to the mobile communication device. Thus, the consumer's identity information is more secure in this system.

Another advantage to a consumer is that the consumer has more control over his identity information and over the transaction in general. In prior systems, the consumer had to provide his identity information (e.g., a PAN or personal account number) to the merchant access device (e.g., the point of sale terminal) in order to conduct a transaction. In this system, the mobile communication device has much of the functionality of a merchant access device. The mobile communication device can be used to initiate, authorize, and/or terminate the transaction. Since the consumer is in control of the mobile communication device, the consumer decides when to conduct the transaction and to whom he will provide his identity information. Thus, control of the transaction and identity information is given back to the consumer.

An advantage to merchants and issuers is that these methods and systems are easier to secure and can prevent monetary losses due to identity theft. As discussed above, these systems are inherently more secure and thus should reduce fraud and money lost to fraud. Further, the issuer can save money by concentrating their fraud deterrent efforts on protecting information communicated between the server computer of the payment processing network and the mobile communication device.

An advantage to the payment processing network is that the network can more easily secure the communications to the consumer. As discussed above, the mobile communication device can include a secure chip with encryption software which is frequently updated by the payment processing network. Also, the encryption algorithms can be more complex since communications are not sent through a series of other entities.

Another advantage to the payment processing network is that the payment processing network can develop a more sophisticated transaction process since it has a more detailed account of the transaction. The mobile communication device can receive greater detail about the transaction and relay it to the payment processing network. With increased information, the payment processing network has the opportunity to develop new and more sophisticated techniques of processing transactions.

Certain embodiments of the invention may include none, some, or all of the above technical advantages. One or more other technical advantages may be readily apparent to one skilled in the art from the figures, descriptions, and claims included herein.

Before discussing specific embodiments of the invention, some descriptions of some specific terms are provided below.

Transaction information: may be any suitable information related to the transaction. For example, at least one of a list of the items in the transaction, a description of the items, item identifiers (e.g., stock keeping units or SKUs), prices of the items being purchased, the total number of items, the total amount of the transaction, and a transaction code. A transaction code is associated with a specific transaction and can be used to identify other transaction information.

Characteristics of the merchant access device: may be unique feature(s) of the merchant access device which may be used to identify the merchant access device. For example, a shape of the merchant access device, a color or arrangement of colors on the merchant access device, an arrangement of elements provided on the merchant access device, where the elements includes at least one of a keypad, a display, a magnetic strip card reader, a printer, a smart card reader, an antenna, and information indicating a unique identifier associated with the merchant access device located outside a display of the merchant access device.

Location data: may be information sufficient to identify a particular location. For example, global positioning system (GPS) coordinates, geographical coordinates (i.e., latitude and longitude), Universal Transverse Mercator (UTM) coordinates, Universal Polar Stereographic (UPS) coordinates, Cartesian coordinates, and a mailing address.

Account information: may be information sufficient to identify a particular account issued by an issuer. For example, a phone number, an alphanumeric sequence (e.g., a name of the consumer, a name of the account, etc.), a dialing tone or sequence of dialing tones, an image or sequence of images (e.g., a picture of the consumer, a fingerprint, etc.), and an audio sequence.

Authorization request message: may be a message that includes a consumer account identifier. The consumer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by cardholders using payment cards. An authorization request message may comprise data elements including, in addition to the account identifier, a service code, a card verification value (CVV), and an expiration date.

Authorization response message: may be an issuing financial institution's electronic message reply to an authorization request, which may include one or more of the following status indicators: Approval—transaction was approved; Decline—transaction was not approved; or Call Center—response pending more information, merchant must call a toll-free authorization phone number. It may also include an authorization code, which may be a code that a credit card issuing bank returns in an electronic message to the merchant's point of sale (POS) terminal that indicates approval of the transaction. The code serves as proof of authorization.

Merchant access device identifier: may be an identifier which identifies a particular merchant access device. For example, an alphanumeric sequence (e.g., a serial number, IP address, MAC address, etc.), a purely alphabetical sequence, a purely numeric sequence, and the like.

Consumer account identifier: may be an identifier which identifies a particular consumer account. For example, an alphanumeric sequence (e.g., an account number issued by an issuer, a number of a payment card issued by an issuer, etc.), a purely alphabetical sequence, a purely numeric sequence, and the like.

I. Exemplary System with Mobile Phone Having Camera

FIG. 1 is a block diagram of an exemplary system 100 for conducting a payment transaction using a camera in a mobile communication device 120 as a vehicle to identify a merchant access device 132, according to one embodiment of the invention. System 100 includes consumer 110, mobile communication device 120, merchant 130, acquirer 140, payment processing network 150, and issuer 160.

Consumer 110 may use mobile communication device 120 in a purchase transaction. Merchant 130 may have merchant access device 132 used to process transactions with consumer 110. Consumer 110 may interact with merchant 130 using mobile communication device 120. Mobile communication device 120 includes a camera and is capable of communicating with payment processing network 150 and, in some embodiments, issuer 160. Merchant 130 is in communication with acquirer 140. Acquirer 140 is in communication with issuer 160 through payment processing network 150. Payment processing network 150 is also in communication with merchant 130.

Consumer 110 may be an individual or an organization such as a business that is capable of using mobile communication device 120 to conduct a transaction such as a purchase of goods and/or services. Consumer 110 has an account with issuer 160 that may be associated with mobile communication device 120.

Mobile communication device 120 refers to any suitable wireless device that allows consumer 110 to conduct transactions with merchant 130 and communicate information with other entities such as payment processing network 150 or issuer 160. Some examples of suitable devices include cellular or wireless phones, personal digital assistants (PDAs), pagers, portable computers, and the like. Suitable mobile communication devices can be hand-held and compact so that they can fit into a consumer's wallet and/or pocket (e.g., pocket-sized). Such mobile communication devices may include a cellular antenna, a GPS antenna, a computer readable medium (CRM) embodied by one or more memory devices, input elements (e.g., a keypad), output devices (e.g., a screen), a microphone, a speaker, and a contactless element, all operatively coupled to a processor. Mobile communication device 120, regardless of its form, includes a camera (not illustrated) operatively coupled to the processor. The camera is operable to acquire images as is known in the art.

Mobile communication device 120 is operable to communicate information to other system entities in any suitable form. Some examples of suitable forms include a short message service (SMS) message such as a text message, a multimedia media message (MMS), a phone call, a voice message, a voicemail message, an instant messaging (IM) message, an email message, etc. Mobile communication device 120 is also operable to communicate images acquired via the camera in any suitable form. Some examples of suitable forms include MMS, IM with imaging capability, an email message, etc. In some cases, the system entity receiving the message (e.g., server computer 152 of payment processing network 150) may require a PIN before authorizing the transmission for security purposes. Consumer 110 enters the PIN into mobile communicating device 120 or other device communicating with the entity. The PIN is then sent to the entity. Once the entity verifies the PIN, the requesting entity will authorize the transmission of the message. For example, to send an SMS message to server computer 152 of payment processing network 150, server computer 152 of payment processing network 150 may request a PIN, receive the PIN, and verify that the PIN is valid before allowing transmission of the SMS message.

In embodiments of the invention, issuer 160 may be associated with mobile communication device 120 in any suitable manner. For example, issuer 160 may have an account that is linked to the phone number in mobile communication device 120. In another example, issuer 160 may have a virtual payment card that is stored on mobile communication device 120.

Merchant 130 can be any suitable entity or entities that make a payment transaction with consumer 110. Merchant 130 may use any suitable method to make the payment transaction. For example, merchant 130 may be a department store, a gas station, a drug store, a grocery store, or other suitable business.

Merchant access device 132 refers to any suitable device for processing transactions with merchant 130 and for interacting with mobile communication device 120. Suitable access devices may include Point of Sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. According to some embodiments, merchant 130 has a plurality of merchant access devices. Each merchant access device may then be associated with a unique identifier that distinguishes it from other merchant access devices that merchant 130 has. Each merchant access device may also have a unique identifier that distinguishes it from merchant devices of other merchants. According to other embodiments, merchant 130 only has a single merchant access device.

Merchant access device 132 may use any suitable contact or contactless mode of operation to communicate data to and from mobile communication device 120. For example, merchant access device 132 can use a wireless communication mode including near field communication such as Bluetooth, infrared, etc. However, benefits from embodiments of the present invention are particularly realized when such wireless communication modes are not available.

Acquirer 140 can be any suitable entity that has an account for merchant 130 and that processes merchant transactions associated with merchant access device 132. For example, acquirer 140 may be a bank that operates a bank account for merchant 130.

Acquirer 140 includes a server computer 142. Server computer 142 refers to a powerful computer or cluster of computers. For example, server computer 142 can be a large mainframe, a minicomputer cluster, or a group of servers functioning as a unit. In one example, server computer 142 may be a database server coupled to a Web server (not shown). Server computer 142 includes a processor 144 coupled to a CRM 146. CRM 146 comprises code for performing the functions of server computer 142, where processor 144 functions to execute the code.

Acquirer 140 may also include a database (not shown) coupled to server computer 142. The database refers to any hardware, software, firmware, or combination of the preceding for storing and facilitating retrieval of information. The database may use any of a variety of data structures, arrangements, and compilations to store and facilitate retrieval of information. The database may store any suitable data. Acquirer 140 may use any suitable wired or wireless network, including the Internet, to communicate with other entities.

Payment processing network 150 refers to a network of suitable entities that have information related to the account associated with consumer 110 and issued by issuer 160. Payment processing network 150 may also have information related to the account associated with merchant 130 and held by acquirer 140. This information includes profile information and other suitable information that may be used to complete a transaction between consumer 110 and merchant 130 involving the account.

Payment processing network 150 may include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes a Visa Integrated Payments (VIP) system which processes authorization requests and a Base II system which performs clearing and settlement services.

Payment processing network 150 includes a server computer 152. Server computer 152 refers to a powerful computer or cluster of computers. For example, server computer 152 can be a large mainframe, a minicomputer cluster, or a group of servers functioning as a unit. In one example, server computer 152 may be a database server coupled to a Web server (not shown). Payment processing network 150 may use any suitable wired or wireless network, including the Internet, to communicate with other entities.

Server computer 152 includes a CRM 153 and a processor 154 coupled to CRM 153. CRM 153 comprises code for performing the functions of server computer 152, where processor 154 functions to execute the code.

Payment processing network 150 may also include a merchant database 156 and a consumer database 158 each coupled to server computer 152 such that server computer 152 may access information stored in merchant database 156 and consumer database 158. Merchant database 156 and consumer database 158 refer to any hardware, software, firmware, or combination of the preceding for storing and facilitating retrieval of information. Merchant database 156 and consumer database 158 may use any of a variety of data structures, arrangements, and compilations to store and facilitate retrieval of information. According to some embodiments, merchant database 156 and consumer database 158 are provided as a single database rather than separate databases.

Figure 2A:
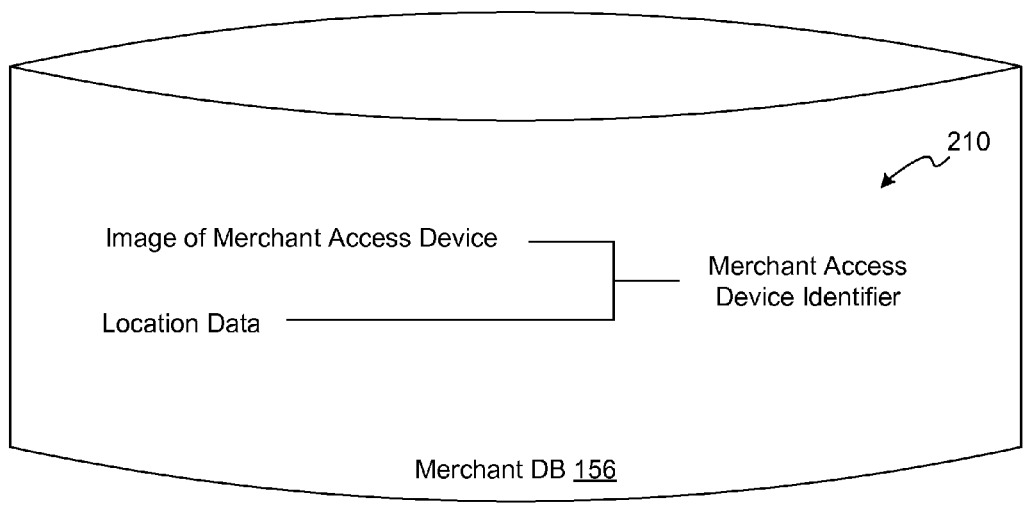
FIG. 2A is a diagrammatic representation of a merchant database storing images of merchant access devices and location data and their association with merchant access device identifiers, according to one embodiment of the invention.

FIG. 2A is a diagrammatic representation of merchant database 156 storing images of merchant access devices and location data and their association with merchant access device identifiers, according to one embodiment of the invention. That is, merchant access device 132 may be associated with at least one of an image of merchant access device 132 and a location data of merchant access device 132. Merchant database 156 may store a merchant access device identifier. The merchant access device identifier may be an identifier which identifies a particular merchant access device. For example, an alphanumeric sequence (e.g., a serial number, IP address, MAC address, etc.), a purely alphabetical sequence, a purely numeric sequence, and the like. Merchant database 156 may also store an association between an identifier of merchant access device 132 and at least one of the image of merchant access device 132 and the location data of merchant access device 132. Merchant database 156 may also store at least one of the image of merchant access device 132 and the location data of merchant access device 132.

According to some embodiments, merchant database 156 may additionally or alternatively store other information indicating characteristics of merchant access device 132. For example, merchant database 156 may store at least one of information indicating a shape of merchant access device 132, information indicating a color or arrangement of colors on merchant access device 132, information indicating an arrangement of elements provided on merchant access device 132, wherein the elements include at least one of a keypad, a display, a magnetic strip card reader, a printer, a smart card reader, an antenna, and information indicating a unique identifier associated with the merchant access device located outside a display of the merchant access device. The unique identifier may be an alphanumeric number or element associated with the merchant access device, a serial number associated with the merchant access device, or a barcode associated with the merchant access device. The merchant access device identifier may be associated with any or all of this type of information.

According to some embodiments, merchant database 156 may store various types of location data. For example, merchant database 156 may store at least one of global positioning system (GPS) coordinates, geographical coordinates (i.e., latitude and longitude), Universal Transverse Mercator (UTM) coordinates, Universal Polar Stereographic (UPS) coordinates, Cartesian coordinates, a mailing address, and the like. Merchant access device 132 may be associated with any or all of this type of information.

Figure 2B:
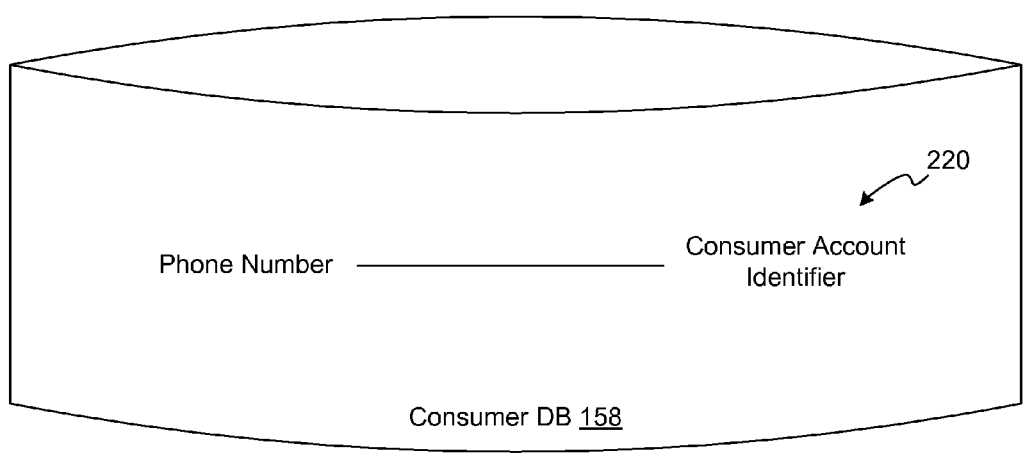
FIG. 2B is a diagrammatic representation of a consumer database storing phone numbers of mobile communication devices and their association with consumer account identifiers, according to one embodiment of the invention.

FIG. 2B is a diagrammatic representation of consumer database 158 storing phone numbers of mobile communication devices and their association with consumer account identifiers, according to one embodiment of the invention. That is, an account for consumer 110 issued by issuer 160 may be associated with a phone number. Consumer database 158 may store a consumer account identifier. The consumer account identifier may be an identifier which identifies a particular consumer account. For example, an alphanumeric sequence (e.g., an account number issued by an issuer, a number of a payment card issued by an issuer, etc.), a purely alphabetical sequence, a purely numeric sequence, and the like. Consumer database 158 may also store the phone number, and an association between the consumer account identifier and the phone number.

According to some embodiments, consumer database 158 may additionally or alternatively store other account-related information linked to the consumer account identifier. For example, consumer database 158 may store an alphanumeric sequence (e.g., a name of the consumer, a name of the account, etc.), a dialing tone or sequence of dialing tones, an image or sequence of images (e.g., a picture of the consumer, a fingerprint, etc.), an audio sequence, etc. The consumer account identifier may be associated with any or all of this type of information.

Returning to FIG. 1, issuer 160 may be any suitable entity that can approve a transaction, and may optionally open and maintain an account associated with consumer 110. For example, issuer 160 may be a bank, a business entity such as a retail store, or a governmental entity that issues a payment account to consumer 110. In many cases, issuer 160 may also issue a payment card to consumer 110. In some embodiments, issuer 160 may also be the acquirer 140.

Issuer 160 includes a server computer 162. Server computer 162 refers to a powerful computer or cluster of computers. For example, server computer 162 can be a large mainframe, a minicomputer cluster, or a group of servers functioning as a unit. In one example, server computer 162 may be a database server coupled to a Web server (not shown). Server computer 162 includes a processor 164 coupled to a CRM 166. CRM 166 comprises code for performing the functions of server computer 162, where processor 164 functions to execute the code.

Issuer 160 may also include a database (not shown) coupled to server computer 162. The database refers to any hardware, software, firmware, or combination of the preceding for storing and facilitating retrieval of information. The database may use any of a variety of data structures, arrangements, and compilations to store and facilitate retrieval of information. The database may store any suitable data. Issuer 160 may use any suitable wired or wireless network, including the Internet, to communicate with other entities.

In a typical payment transaction between consumer 110 and merchant 130, consumer 110 purchases goods or services at the merchant 130. During the transaction, merchant access device 132 may show the total purchase amount and/or may show a listing of the purchased items. At this point, consumer 110 may use a camera in mobile communication device 120 to take a picture of merchant access device 132. Consumer 110 may then communicate the picture to server computer 152 of payment processing network 150 or server computer 162 of issuer 160. Most merchant access devices are unique in appearance or have unique characteristics, which can make them identifiable. This information can be used by a remoter server computer to determine the exact access device that was used to conduct the transaction. In some embodiments, consumer 110 may also use mobile communication device 120 to send location data to server computer 152 of payment processing network 150. The location data may indicate a location of mobile communication device 120. The location data may be used along with the picture to determine the exact merchant access device that was used to conduct the transaction.

Merchant access devices may have various characteristics which make them unique. For example, unique characteristics for purposes of identification may include at least one of a shape of the merchant access device, a color or arrangement of colors on the merchant access device, and an arrangement of elements provided on the merchant access device. The elements may be any of those typically found on merchant access devices. For example, they may include at least one of a keypad, a display, a magnetic strip card reader, a printer, a smart card reader, and an antenna. Other unique characteristics may include a unique identifier associated with the merchant access device. For example, the unique identifier may be an alphanumeric number or element associated with the merchant access device, a serial number associated with the merchant access device, or a barcode associated with the merchant access device. In some embodiments, the unique identifier is provided on a display of the merchant access device. In other embodiments, the unique identifier is provided on portions of the merchant access device other than the display.

According to some embodiments, identification of a merchant may be sufficient to identify a particular merchant access device. For example, where a merchant only has a single merchant access device, identification of the merchant is sufficient to identify the merchant access device. In such cases, merchant access devices may need only provide characteristics sufficient to identify the merchant. For example, unique characteristics may include at least one of a trademark associated with the merchant, a structural element of a merchant access device provided only to a particular merchant; a graphical element of a merchant access device provided only to a particular merchant, an alphanumeric number or element associated only with the merchant, and a serial number associated only with the merchant.

According to other embodiments, information indicating unique characteristics of a merchant and/or merchant access device may be combined with location data to identify at least one of a merchant access device and a merchant. Various types of location data have previously been discussed.

In one embodiment, location data may be generated by mobile communication device 120. For example, mobile communication device 120 may use a GPS antenna to determine the GPS coordinates of mobile communication device. In another embodiment, location data may not be generated by mobile communication device 120, but instead, may be provided from another source. For example, if mobile communication device 120 is a mobile telephone, server computer 152 may contact the carrier hosting mobile communication device 120 in order to receive the location data of mobile communication device 120. The location data may be generated using, for example, triangulation methods. In yet another embodiment, location data may be communicated to server computer 152 of payment processing network 150 by consumer 110. For example, consumer 110 my input location data into mobile communication device 120 which subsequently relays such information to server computer 152 of payment processing network 150.

In one embodiment, the image acquired by mobile communication device 120 may include the unique characteristics associated with merchant access device 132 along with transaction information. The transaction information may include, for example, at least one of a list of the items in the transaction, a description of the items, item identifiers (e.g., stock keeping units or SKUs), prices of the items being purchased, the total number of items, the total amount of the transaction, and a transaction code. A transaction code is associated with a specific transaction and can be used to identify other transaction information. The transaction information may then be sent to server computer 152 of payment processing network 150 by mobile communication device 120.

In another embodiment, consumer 110 may input transaction information into mobile communication device 120. The transaction information may then be sent to server computer 152 of payment processing network 150 by mobile communication device 120.

In other embodiments, the transaction information may be sent to server computer 152 of payment processing network 150 by merchant 130 or merchant access device 132 instead of mobile communication device 120. For example, the transaction information may be sent directly to server computer 152 of payment processing network 150 from merchant access device 132. For another example, the transaction information may be sent to server computer 142 of acquirer 140 from merchant access device 132, and then server computer 142 of acquirer 140 may then subsequently send the transaction information to server computer 152 of payment processing network 150. For yet another example, after identifying merchant access device 132, server computer 152 of payment processing network 150 may directly communicate with merchant access device 132 in order to obtain the transaction information.

Using mobile communication device 120, consumer 110 sends account information to server computer 152 of payment processing network 150. The account information identifies an account associated with consumer 110 and issued by issuer 160. In one embodiment, consumer 110 may send the account information directly to server computer 152 of payment processing network 150. For example, consumer 110 may enter, into mobile communication device 120, an account number or other information recognized by issuer 160 to identify the account issued to consumer 110. Consumer 110 may then cause mobile communication device 120 to send such information to server computer 152 of payment processing network 150. In other embodiments, server computer 152 of payment processing network 150 may deduce the account associated with consumer using information sent by mobile communication device 120. For example, mobile communication device 120 may send a phone number of mobile communication device 120 to server computer 152 of payment processing network 150. Server computer 152 of payment processing network 150 may then compare the received phone number with phone numbers stored in consumer database 158 to determine a matching phone number. Server computer 152 may then identify a consumer account identifier associated with the matching phone number. As previously described, the consumer account identifier identifies the account for consumer 110 issued by issuer 160. In other embodiments, server computer 152 of payment processing network 150 may receive the phone number of mobile communication device 120 from another entity, such as a telecommunications company or network associated with mobile communication device 120.

Using the data retrieved from the image and, in some embodiments, the location data, server computer 152 of payment processing network 150 identifies the particular merchant access device associated with merchant 130 that is used to perform the payment transaction between merchant 130 and consumer 110. Prior to the transaction, images, geographical locations, or other information about the various merchant access devices used at various merchants may be stored in merchant database 156 and may be mapped to merchant access device identifiers. Examples of such information have previously been described, and such descriptions are equally applicable herein. Also, a table mapping account information such as phone numbers to consumer account identifiers may be present in consumer database 158. Examples of such information have also previously been described, and such descriptions are equally applicable herein. Using information such as this, server computer 152 of payment processing network 150 then generates and sends an authorization request to issuer 160. For example, server computer 152 may identify the merchant, the specific merchant access device being used, and the amount of the transaction, from the information that has been received and from the information in the database. It may also identify the consumer account number (as well as expiration date and other payment card information) from the consumer's phone number. All or some of this information may be included in the authorization request message that is sent to server computer 162 of issuer 160.

Upon receiving the authorization request, issuer 160 processes the authorization request message and determines whether to authorize or decline the transaction. Once issuer 160 decides whether to authorize or decline the transaction, server computer 162 of issuer 160 generates and sends an authorization response message which indicates whether the transaction is approved or declined. Issuer 160 may decline the transaction for a variety of reasons (e.g., insufficient funds, risky transaction, etc.).

According to one embodiment, issuer 160 sends the authorization response message to server computer 152 of payment processing network 150. Server computer 152 then sends the authorization response message to server computer 142 of acquirer 140. Server computer 142 of acquirer 140 then forwards the authorization response message to merchant 130 or merchant access device 132. Merchant 130 or merchant access device 132 may provide the authorization response message to consumer 110. For example, the data associated with the authorization response message may be displayed on a display of merchant access device 132 or may be printed on a receipt. In some cases, server computer 152 of payment processing network 150 sends the authorization response message directly to consumer 110. For example, the authorization response message may be sent from server computer 152 of payment processing network 150 directly to mobile communication device 120 without being sent through acquirer 140 or merchant 130. The data associated with the authorization message may then be displayed on a display of mobile communication device 120.

In some cases, payment processing network 150 can authorize the transaction on behalf of issuer 160. In these cases, payment processing network 150 processes the information received from mobile communication device 120. After processing, server computer 152 of payment processing network 150 has information about the consumer using mobile communication device 120, the issuer having an account associated with mobile communication device 120, the merchant and/or merchant access device engaged in the transaction, and the transaction. With this information, server computer 152 of payment processing network 150 can determine whether to authorize or decline the transaction on behalf of issuer 160. Server computer 152 sends an authorization response message to acquirer 140. Server computer 142 of acquirer 140 forwards the authorization response message to merchant 130 which forwards it to consumer 110. Server computer 152 may also send a message to issuer 160 indicating that the transaction has been authorized on their behalf and including other suitable information required by issuer 160 to process the transaction.

In one embodiment, mobile communication device 120 relays some or all information directly to issuer 160. The information may be sent in any suitable form such as an authorization request message. In this embodiment, issuer 160 determines whether to authorize or decline the transaction based on the information received from mobile communication device 120. If issuer 160 requires more information from consumer 110 to decide whether to authorize or decline the transaction, server computer 162 of issuer 160 may send a request message for more information to consumer 110 through mobile communication device 120 (or, in some embodiments, through merchant 130 or merchant access device 132). Once issuer 160 decides whether to authorize or decline the transaction, server computer 162 of issuer 160 directly or indirectly sends an authorization response message to at least one of mobile communication device 120, merchant access device 132, and merchant 130.

In another embodiment, server computer 152 of payment processing network 150 may send the authorization response message directly to mobile communication device 120 operated by consumer 110 instead of to merchant access device 132. Consumer 110 can provide the authorization response message to merchant 130 using mobile communication device 120. For example, consumer 110 may cause mobile communication device 120 to pass by a contactless reader of merchant access device 132 so that the merchant access device 132 can read the authorization response message from mobile communication device 120.

In some embodiments, at least one of merchant database 156 and consumer database 158 are provided in mobile communication device 120. In such cases, mobile communication device 120 may be operable to perform the comparisons and identifications using merchant database 156 and consumer database 158 previously described with respect to server computer 152 of payment processing network 150. In such cases, after performing such comparisons and identifications, mobile communication device 120 may communicate the results of such comparisons and identifications to sever computer 152 of payment processing network 150 or server computer 162 of issuer 160.

At the end of the day, a normal clearing and settlement process may be conducted. A clearing process is a process of exchanging financial details between merchant 130 and issuer 160 to facilitate posting to a consumer's account and reconciliation of the consumer's settlement position. Clearing and settlement can occur simultaneously.

Modifications, additions, or omissions may be made to system 100 without departing from the scope of the disclosure. The components of system 100 may be integrated or separated according to particular needs. For example, although separate functional blocks are shown for an issuer, payment processing network, and acquirer, some entities perform all of these functions and may be included in embodiments of invention. Moreover, the operations of system 100 may be performed by more, fewer, or other system modules. Additionally, operations of system 100 may be performed using any suitable logic comprising software, hardware, other logic, or any suitable combination of the preceding.

II. Exemplary Mobile Communication Device

Figure 3:
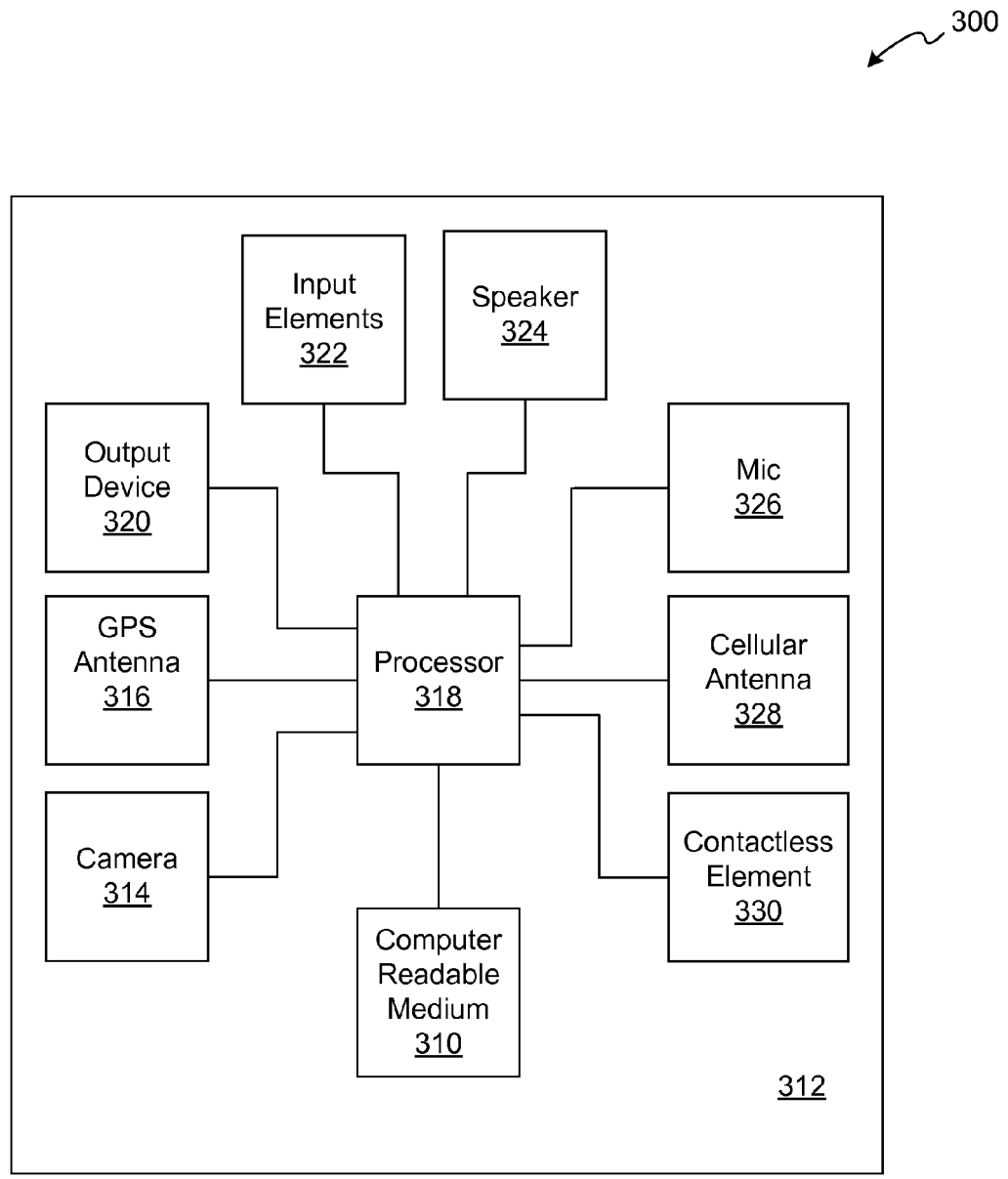
FIG. 3 is a block diagram of the basic components that may reside in an exemplary mobile communication device in the form of a mobile phone, in accordance with an embodiment of the disclosure.

FIG. 3 is a block diagram of the basic components that may reside in an exemplary mobile communication device 300 in the form of a mobile phone, in accordance with an embodiment of the disclosure. Mobile communication device 300 comprises a CRM 310. CRM 310 may be present within a body 312, or may be detachable from it. Body 312 may be in the form a plastic substrate, housing, or other structure. CRM 322 may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by mobile communication device 120.

CRM 310, or memory, may further comprise any suitable code. The code may be suitable to perform any or all of the functionality of mobile communication device 300 as described herein. In some embodiments, CRM 310, or memory, comprises: a) code for receiving information from merchant access device 132; b) code for sending information to merchant access device 132; c) code for receiving information from merchant 130; d) code for sending information to merchant 130; e) code for sending information to server computer 162 of issuer 160; f) code for sending information to server computer 152 of payment processing network 150; g) code for receiving information from server computer 152 of payment processing network 150; h) code for sending information to server computer 162 of issuer 160; and/or i) code for receiving information from server computer 162 of issuer 160.

Mobile communication device 300 also comprises a camera 314. Camera 314 is operable to take pictures (i.e., acquire images), and may include any type of image-acquiring device as is known in the art. Mobile communication device 300 may also comprise a GPS antenna 316. GPS antenna 316 is operable to receive transmissions from GPS satellites for identifying a location of mobile communication device 120. GPS antenna 316 may include any type of antenna operable to receive transmissions from GPS satellites as is known in the art.

Mobile communication device 300 may also comprise other elements typically included in mobile communication devices. For example, mobile communication device 300 may also include a processor 318 (e.g., a microprocessor) for processing the functions of the mobile communication device 300 and an output device 320 (e.g., an electronic display) to allow a consumer to see phone numbers and other information and messages. Mobile communication device 300 may further include input elements 322 to allow a consumer to input information into the device, a speaker 324 to allow the consumer to hear voice communication, music, etc., and a microphone 326 to allow the consumer to transmit her voice through mobile communication device 300. Mobile communication device 300 may also include a cellular antenna 328 for wireless voice and data transfer (e.g., voice and data transmission). Although benefits from embodiments of the present invention are particularly realized when such wireless communication device 300 does not include a contactless element, wireless communication device 300 may still include such an element. That is, mobile communication device 300 may include a contactless element 330, which is typically implemented in the form of a semiconductor chip (or other data storage element) with an associated wireless transfer (e.g., data transmission) element, such as an antenna. Contactless element 330 functions to permit the exchange of data and/or control instructions between mobile communication device 300 and an optional contactless element included in a merchant access device.

Although FIG. 3 shows a number of components, mobile communication device 300 according to embodiments of the invention may comprise any suitable combination or subset of such components.

III. Exemplary Merchant Access Device

Figure 4:
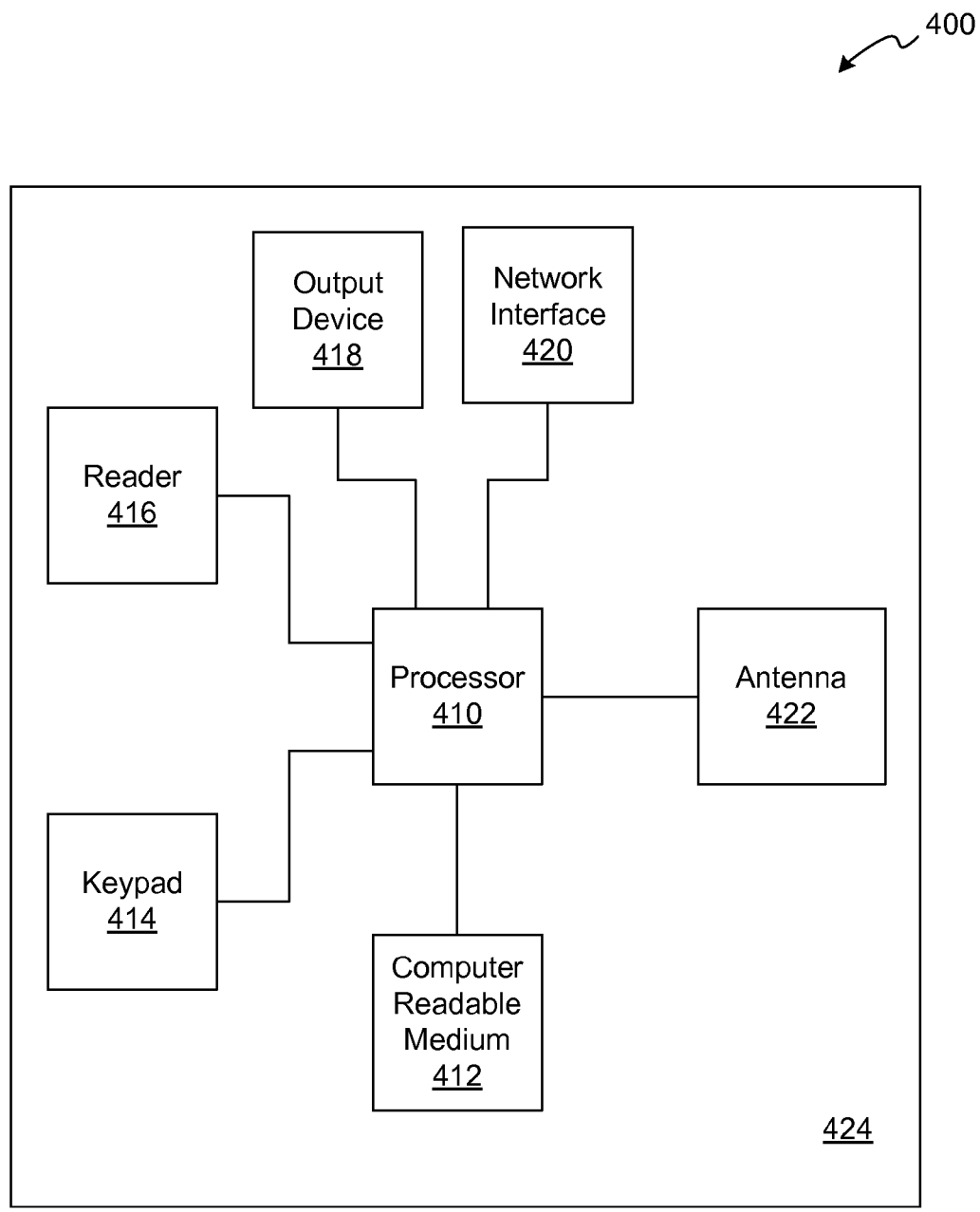
FIG. 4 is a block diagram of the basic components that may reside in an exemplary merchant access device, in accordance with an embodiment of the disclosure.

FIG. 4 is a block diagram of the basic components that may reside in an exemplary merchant access device 400, in accordance with an embodiment of the disclosure. Merchant access device 400 may comprise a processor 410. It may also comprise a CRM 412, a keypad 414, a magnetic strip reader 416, an output device 418, a network interface 420, and an antenna 422. All of these elements may be operatively coupled to processor 410. A housing 424 may house one or more of these components.

CRM 412 may include one or more memory chips, disk drives, etc. CRM 412 may store code or instructions for allowing merchant access device 400 to operate in the manner described herein. The instructions may be executed by processor 410.

CRM 412, or memory, may further comprise any suitable code. The code may be suitable to cause merchant access device 400 to perform any or all of the functionality of merchant access device 400 as described herein. In some embodiments, CRM 412, or memory, comprises: a) code for receiving information from merchant 130; b) code for sending information to merchant 130; c) code for receiving information from mobile communication device 120; d) code for sending information to mobile communication device 120; e) code for receiving information from consumer 110; f) code for sending information to consumer; g) code for sending information to server computer 142 of acquirer 140; h) code for sending information to server computer 152 of payment processing network 150; i) code for sending information to server computer 162 of issuer 160; j) code for receiving information from server computer 142 of acquirer 140; k) code for receiving information from server computer 152 of payment processing network 150; and/or l) code for receiving information from server computer 162 of issuer 160.

Keypad 414 may be operable to input information such as transaction information into merchant access device 400. Magnetic strip reader 416 may be operable to read information from a magnetic strip of a card such as a credit card or a debit card. Output device 418 may include a display. The display may display, for example, transaction information. Network interface 420 may be operable to enable merchant access device 400 to communicate with other system entities. For example, it may enable merchant access device 400 to communicate with one or more of acquirer 140, payment processing network 150, and issuer 160. Antenna 422 may be provided to enable merchant access device 400 to operate remotely.

Figure 5:
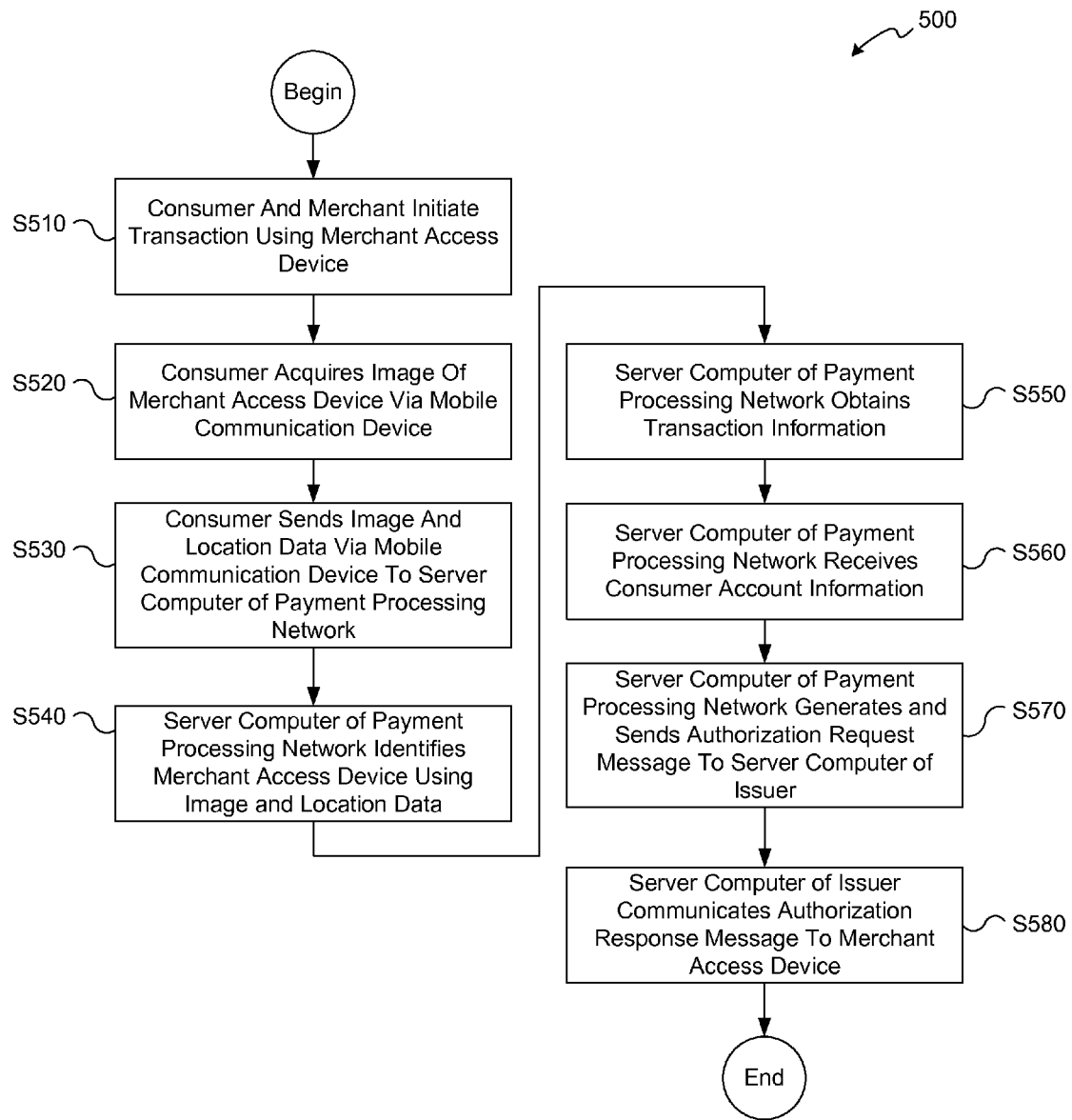
FIG. 5 is a flowchart illustrating a method of processing a payment transaction using a camera in a mobile communication device as a vehicle to identify a merchant access device.

IV. Exemplary Methods of Processing a Payment Transaction Using a Mobile Communication Device Having a Camera FIG. 5 is a flowchart that illustrates one embodiment of a process of using a camera in a mobile communication device as a vehicle to identify a merchant access device.

In step S510, consumer 110 and merchant 130 initiate a transaction using merchant access device 132. The transaction may be for the purchase of goods or services from merchant 130 by consumer 110. Merchant 130 may enter transaction information into merchant access device 132, and such information may be stored by merchant access device 132 and displayed to consumer 110 on a display of merchant access device 132. Various types of transaction information have previously been described, and such descriptions are equally applicable herein.

In step S520, in order to get approval to complete the transaction, consumer 110 acquires an image of merchant access device 132 using mobile communication device 120. Consumer 110 may have mobile communication device 120 in their possession during the transaction. Consumer 110 may use camera 314 of mobile communication device 120 to acquire the image of merchant access device 132.

According to some embodiments, the image includes information sufficient to identify merchant access device 132 from a plurality of merchant access devices, such as information indicating characteristics of merchant access device 132 as previously described. According to other embodiments, the image includes information sufficient to identify merchant 130 from a plurality of merchants, such as information including unique characteristics of merchants as previously described. According to yet other embodiments, the image includes transaction information as previously described. For example, the image may include some or all of transaction information displayed by a display on merchant access device 132.

In some embodiments, consumer 110 may use camera 314 of mobile communication device 120 to acquire an image of the entire merchant access device 132 or only portions of merchant access device 132. The image may include only portions of merchant access device 132 which include characteristics sufficient to identify at least one of merchant 130 and merchant access device 132. The portions may be portions of merchant access device 132 excluding output device 320 (e.g., a display) of merchant access device 132.

In step S530, consumer 110 sends the acquired image and, in some embodiments, location data via mobile communication device 120 to server computer 152 of payment processing network 150.

Location data indicates a location of mobile communication device 120 and may include any of the previously described types of location data. In one embodiment, location data comprises GPS coordinates determined by mobile communication device 120. In another embodiment, mobile communication device 120 receives input from consumer 110 indicating a location of mobile communication device 120. In yet another embodiment, mobile communication device 120 does not send location data; rather, it is sent to server computer 152 of payment processing network 150 by another source. For example, the carrier hosting mobile communication device 120 may use triangulation methods or the like to determine the location of mobile communication device 120 and the carrier may then send such information to sever computer 152 of payment processing network 150.

In step S540, server computer 152 of payment processing network 150 then uses the received image and, in some embodiments, the received location data to identify merchant access device 132.

In some embodiments, server computer 152 of payment processing network 150 uses a received image (or other information indicating characteristics of merchant access devices) to identify merchant access device 132. Prior to the transaction, images (or other information indicating characteristics of merchant access devices) are stored in merchant database 156. Examples of such information have previously been described, and such descriptions are equally applicable herein. The images are mapped to merchant access device identifiers, where each merchant access device identifier identifies a particular merchant access device. The merchant access device identifiers and the mapping between identifiers and images are also stored in merchant database 156. In response to receiving an image from mobile communication device 120, server computer 152 of payment processing network 150 compares the received image with the images stored in merchant database 156 to determine a matching image. Server computer 152 of payment processing network 150 then locates the merchant access device identifier associated with the matching image. The merchant access device identifier may then be used to identify the particular merchant access device used in the transaction.

In some embodiments, server computer 152 of payment processing network 150 uses both a received image and received location data to identify merchant access device 132. Prior to the transaction, images and location data are stored in merchant database 156. Examples of such information have previously been described, and such descriptions are equally applicable herein. Both the images and location data are mapped to merchant access device identifiers. For example, both a single image and location data indicating a particular location may be mapped to a single merchant access device identifier. The merchant access device identifiers and the mapping between identifiers, images, and location data are also stored in merchant database 156. In response to receiving an image and location data, server computer 152 of payment processing network 150 compares the received image with the images stored in merchant database 156 to determine a matching image. Server computer 152 may then compare the received location data with the location data stored in merchant database 156 to determine a matching location data. For example, if the location data is a GPS location, the received GPS location may be compared with GPS locations stored in merchant database 156 to determine a matching GPS location. Server computer 152 of payment processing network 150 then locates the merchant access device identifier associated with the matching image and the matching location data.

In some embodiments, server computer 152 of payment processing network 150 uses a received image (or other information indicating characteristics of merchant access devices) to identify merchant 130. Prior to the transaction, images (or other information indicating characteristics of merchants) are stored in merchant database 156. Examples of such information have previously been described, and such descriptions are equally applicable herein. The images are mapped to merchant identifiers, where each merchant identifier identifies a particular merchant. The merchant identifiers and the mapping between identifiers and images are also stored in merchant database 156. In response to receiving an image from mobile communication device 120, server computer 152 of payment processing network 150 compares the received image with the images stored in merchant database 156 to determine a matching image. Server computer 152 of payment processing network 150 then locates the merchant identifier associated with the matching image. The merchant identifier may then be used to identify the particular merchant used in the transaction. In some embodiments, merchant 130 is only associated with a single merchant access device. Accordingly, by identifying merchant 130, server computer 152 of payment processing network 150 effectively identifiers merchant access device 132.

In some embodiments, server computer 152 of payment processing network 150 uses both a received image and received location data to identify merchant 130. Prior to the transaction, images and location data are stored in merchant database 156. Examples of such information have previously been described, and such descriptions are equally applicable herein. Both the images and location data are mapped to merchant identifiers. For example, both a single image and location data indicating a particular location may be mapped to a single merchant identifier. The merchant identifiers and the mapping between identifiers, images, and location data are also stored in merchant database 156. In response to receiving an image and location data, server computer 152 of payment processing network 150 compares the received image with the images stored in merchant database 156 to determine a matching image. Server computer 152 may then compare the received location data with the location data stored in merchant database 156 to determine a matching location data. For example, if the location data is a GPS location, the received GPS location may be compared with GPS locations stored in merchant database 156 to determine a matching GPS location. Server computer 152 of payment processing network 150 then locates the merchant identifier associated with the matching image and the matching location data. The merchant identifier may then be used to identify the particular merchant used in the transaction. In some embodiments, merchant 130 is only associated with a single merchant access device. Accordingly, by identifying merchant 130, server computer 152 of payment processing network 150 effectively identifiers merchant access device 132.

In some embodiments, server computer 152 of payment processing network 150 uses a received location data to identify merchant 130 and a received image to identify merchant access device 132. Prior to the transaction, images and location data are stored in merchant database 156. Examples of such information have previously been described, and such descriptions are equally applicable herein. The location data may be mapped to merchant identifiers, and images may be mapped to merchant access device identifiers. According to one embodiment, each merchant is associated with a set of merchant access devices which the merchant may control. Thus, each merchant identifier may be associated with a set of merchant access device identifiers. All of this information may be stored in merchant database 156. In response to receiving an image and location data, server computer 152 of payment processing network 150 may compare the received location data with the location data stored in merchant database 156 to determine matching location data. Server computer 152 may then locate the merchant identifier mapped to the matched location data. Using the merchant identifier, server computer 152 may determine the merchant access identifiers associated with the merchant identifier. Server computer 152 may then compare the receive image with the images mapped to the associated merchant access identifiers. Server computer 152 of payment processing network 150 may then locate the merchant access device identifier mapped to the matching image. In some embodiments, the merchant identifier may be used to identify the particular merchant used in the transaction. In other embodiments, the merchant access device identifier may be used to identify the particular merchant access device used in the transaction.

Techniques for using received image and location data to identify merchant access devices and merchants are not limited to those described. Rather, other methods for using at least one of image and location data to identify at least one of merchant access devices and merchants are within the scope of the invention.

In step S550, server computer 152 of payment processing network 150 obtains the transaction information. Various types of transaction information have previously been described, and such descriptions are equally applicable herein. Further, server computer 152 of payment processing network 150 may obtain the transaction information using one or more of a variety of techniques.

In one embodiment, mobile communication device 120 communicates transaction information to server computer 152 of payment processing network 150. The information may be communicated directly to server computer 152 of payment processing network 150, or via other entities. Mobile communication device 120 may acquire the transaction information using one or more of a variety of techniques. For example, consumer 110 may input the transaction information into mobile communication device 120. For another example, mobile communication device 120 may take a picture of the transaction information. The transaction information may be in the same picture as the picture including characteristics of at least one of a merchant and merchant access device. Alternatively, the transaction information may be in a different picture. According to some embodiments, the picture including transaction information is sent to server computer 152 of payment processing network 150. According to other embodiments, mobile communication device 120 extracts the transaction information from the picture and then sends the transaction information to server computer 152 of payment processing network 150.

In another embodiment, the transaction information may be sent to server computer 152 of payment processing network 150 by merchant 130 or merchant access device 132 instead of or in addition to mobile communication device 120. For example, the transaction information may be sent directly to server computer 152 of payment processing network 150 from merchant access device 132. For another example, the transaction information may be sent to server computer 142 of acquirer 140 from merchant access device 132, and then server computer 142 of acquirer 140 may subsequently send the transaction information to server computer 152 of payment processing network 150. For yet another example, after identifying merchant access device 132, server computer 152 of payment processing network 150 may directly communicate with merchant access device 132 in order to get the transaction information needed to generate the authorization request message.

In step S560, server computer 152 of payment processing network 150 receives consumer account information and identifies a consumer account using such information.

In some embodiments, server computer 152 of payment processing network 150 may deduce an account associated with consumer using a received phone number. For example, prior to the transaction, phone numbers may be stored in consumer database 158. The phone numbers may be mapped to consumer account identifiers, where each consumer account identifier identifies an account for consumer 110 issued by issuer 160. The consumer account identifiers and the mapping between identifiers and phone numbers are also stored in consumer database 158. In response to receiving a phone number from mobile communication device 120, server computer 152 of payment processing network 150 compares the received phone number with the phone numbers stored in consumer database 158 to determine a matching phone number. Server computer 152 of payment processing network 150 then locates the consumer account identifier associated with the matching phone number. The consumer account identifier may then be used to identify the account for consumer 110 issued by issuer 160.

In other embodiments, server computer 152 of payment processing network 150 may deduce an account associated with consumer using other received account-related information. For example, prior to the transaction, user names may be stored in consumer database 158. The user names may be mapped to consumer account identifiers. Consumer 110 may communicate a user name to server computer 152 of payment processing network 150, for example, via mobile communication device 120. Server computer 152 of payment processing network 150 may then perform matching similar to that described above with respect to phone numbers so as to identify the account for consumer 110 issued by issuer 160. Other account-related information, as previously described, may similarly be used.

In some embodiments, mobile communication device 120 may directly communicate an account identifier to server computer 152 of payment processing network 150. For example, consumer 110 may enter, into mobile communication device 120, an account number or other information recognized by issuer 160 to identify the account issued to consumer 110. The account number may be entered by at least one of an alphanumeric sequence, dialing tone or sequence of dialing tones, image or sequence of images, audio sequence, etc. Consumer 110 may then cause mobile communication device 120 to send such information to server computer 152 of payment processing network 150. In such a case, server computer 152 may not perform matching as previously described.

In step S570, server computer 152 of payment processing network 150 generates and sends an authorization request message to server computer 162 of issuer 160 to facilitate completion of the transaction.

In some embodiments, server computer 152 of payment processing network 150 uses the merchant access device identifier, transaction information, and consumer account identifier to generate the authorization request message. Server computer 152 may extract, from the transaction information, a transaction amount to be authorized. Server computer 152 may then generate an authorization request message which requests authorization of the transaction amount from the consumer account identified by the consumer account identifier. The authorization request message may include merchant access device identifier so that issuer 160 may direct a response to the merchant access device identified by the merchant access device identifier.

In other embodiments, server computer 152 of payment processing network 150 uses the merchant identifier, transaction information, and consumer account identifier to generate the authorization request message so that issuer 160 may direct a response to the merchant identified by the merchant identifier. In yet other embodiments, server computer 152 of payment processing network 150 uses both a merchant identifier and a merchant access device identifier so that issuer 160 may direct a response to at least one of the merchant and merchant access device. In yet other embodiments, server computer 152 of payment processing network 150 does not include a merchant access device identifier or a merchant identifier. For example, issuer 160 may provide the response to server computer 152 of payment processing network rather than the merchant or merchant access device. Server computer 152 may then forward the response to the merchant or merchant access device.

In step S580, server computer 162 of issuer 160 communicates an authorization response message to merchant access device 132. Issuer 160 may first receive the authorization request message, process the authorization request to generate an authorization response message, and then send the authorization response message. Processing the authorization request includes determining whether to authorize or decline the transaction. The authorization response message is a message indicating whether the transaction is approved or declined. Issuer 160 may decline the transaction for a variety of reasons (e.g., insufficient funds, risky transaction, etc.).

In some embodiments, server computer 162 of issuer 160 identifies the merchant access device using a received merchant access device identifier. Server computer 162 may then send an authorization response message to the identified merchant access device. In other embodiments server computer 162 of issuer 160 identifies the merchant using a merchant identifier. Server computer 162 may then send an authorization response message to the identified merchant. In other embodiments server computer 162 of issuer 160 sends an authorization response message to server computer 152 of payment processing network 150. In yet other embodiments server computer 162 of issuer 160 identifies the mobile communication device used in the transaction using, for example, a received consumer account identifier. Server computer 162 may then send an authorization response message to consumer 110 or mobile communication device 120.

Figure 6:
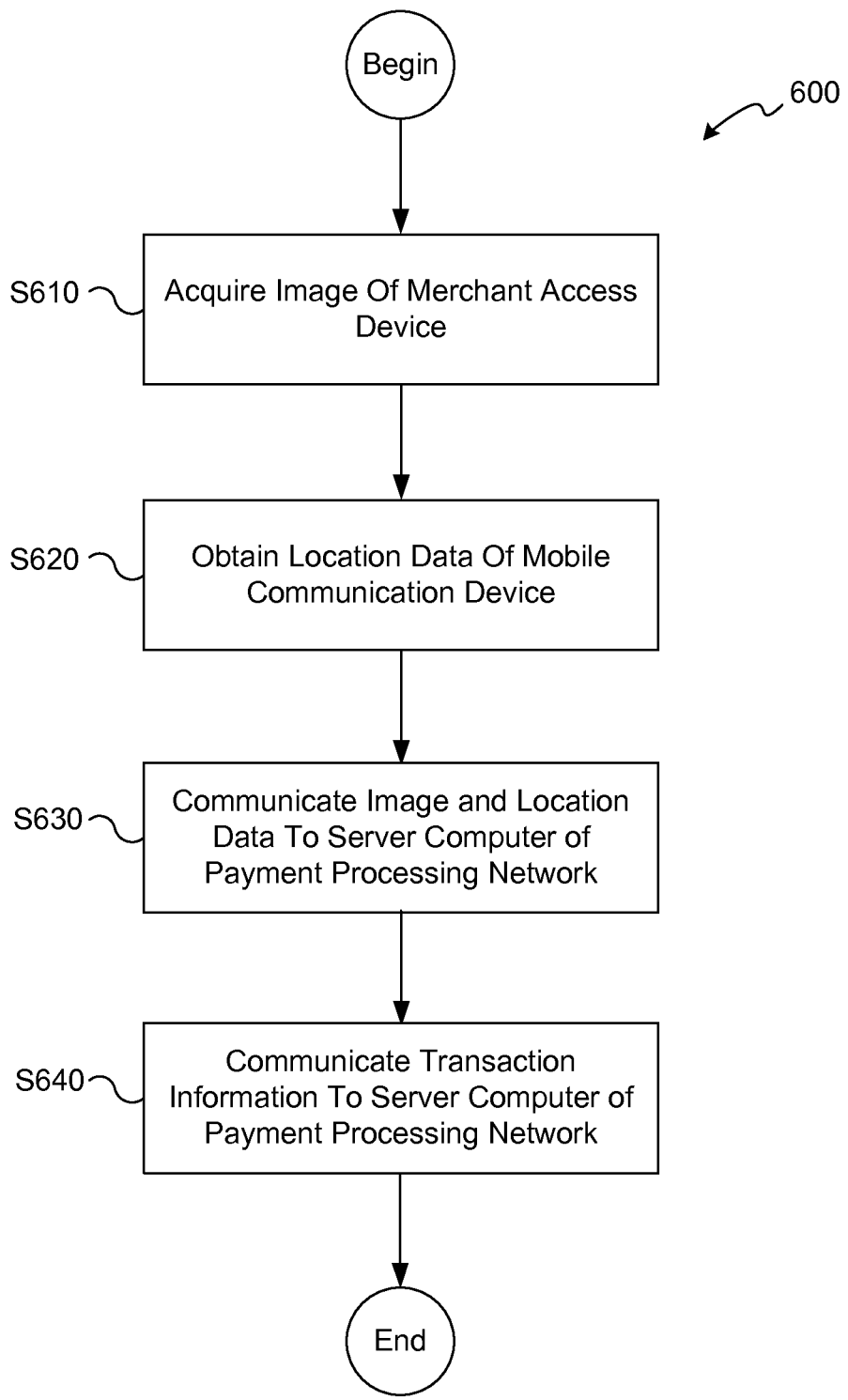
FIG. 6 is a flowchart illustrating a method for a mobile communication device to facilitate a payment transaction where a camera in the mobile communication device is used as a vehicle to identify a merchant access device.

FIG. 6 is a flowchart illustrating a method for mobile communication device 120 to facilitate a payment transaction where camera 314 in mobile communication device 120 is used as a vehicle to identify a merchant access device.

In step S610, mobile communication device 120 acquires an image of merchant access device 132. Consumer 110 may have mobile communication device 120 in their possession during the transaction. Consumer 110 may use camera 314 on mobile communication device 120 to acquire an image of portions of or the entire merchant access device 132.

According to some embodiments, the image includes unique characteristics of merchant access device 132 as previously described. The unique characteristics may be sufficient to identify merchant access device 132 from a plurality of merchant access devices. According to other embodiments, the image includes information sufficient to identify merchant 130 from a plurality of merchants. For example, the image may include unique characteristics of merchant 130 as previously described. According to yet other embodiments, the image includes transaction information as previously described. For example, the image may include some or all of transaction information displayed by a display on merchant access device 132.

In some embodiments, consumer 110 may use camera 314 of mobile communication device 120 to acquire an image of only portions of merchant access device 132. The image may include only portions of merchant access device 132 which include characteristics sufficient to identify at least one of merchant 130 and merchant access device 132. The portions may be portions of merchant access device 132 excluding a display of merchant access device 132.

In step S620, mobile communication device 120 obtains location data of mobile communication device 120.

Various types of location data have been previously described, and such descriptions are equally applicable herein. Further, various techniques for obtaining such location data have also been previously described, and such descriptions are equally applicable herein. For example, according to one embodiment, mobile communication device 120 identifies a GPS location of mobile communication device 120. In such a case, mobile communication device 120 may use GPS antenna 316 to receive transmissions from GPS satellites. Mobile communication device 120 may then use processor 318 to identify a location of mobile communication device 120 using the received transmissions. For another example, mobile communication device 120 may receive location data from consumer 110. In such a case, consumer 110 may input location data into the mobile communication device 120 via input elements 322.

In step S630, mobile communication device 120 communicates the acquired image and location data to server computer 152 of payment processing network 150. For example, mobile communication device 120 may communicate the image and location data using cellular antenna 328.

According to some embodiments, mobile communication device 120 may communicate some or all of such information in an SMS message such as a text message, an MMS message, a phone call, a voice message, a voicemail message, an IM message, an email message, etc.

According to some embodiments, the system entity receiving the message (e.g., payment processing network 150) may require a PIN before authorizing the transmission for security purposes. Consumer 110 enters the PIN into mobile communicating device 120 or other device communicating with the entity. The PIN is then sent to the entity. Once the entity verifies the PIN, the requesting entity will authorize the transmission of the message. For example, to send an SMS message to payment processing network 150, payment processing network 150 may request a PIN, receive the PIN, and verify that the PIN is valid before allowing transmission of the SMS message.

In step S640, mobile communication device 120 communicates transaction information to server computer 152 of payment processing network 150. For example, mobile communication device 120 may communicate transaction information to server computer 152 of payment processing network 150. The information may be communicated directly to server computer 152 of payment processing network 150, or via other entities.

Mobile communication device 120 may first acquire the transaction information using one or more of a variety of techniques. Such techniques have already been described, and such techniques are equally applicable herein. For example, consumer 110 may input the transaction information into mobile communication device 120. For another example, mobile communication device 120 may take a picture of the transaction information. The transaction information may be in the same picture as the picture including characteristics of at least one of a merchant and merchant access device. Alternatively, the transaction information may be in a different picture. According to some embodiments, the picture including transaction information is sent to server computer 152 of payment processing network 150. According to other embodiments, mobile communication device 120 extracts the transaction information from the picture and then sends the transaction information to server computer 152 of payment processing network 150.

Figure 7:
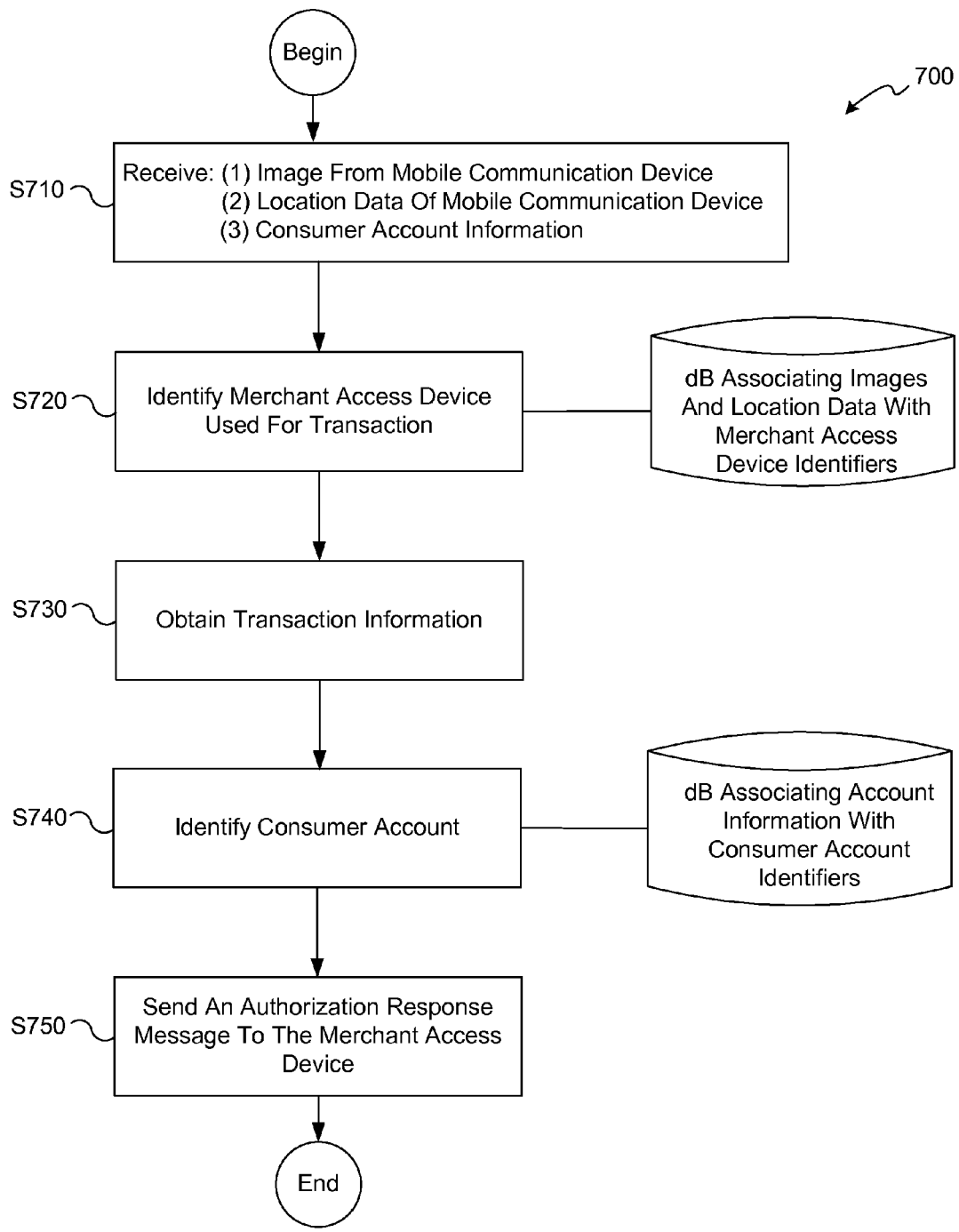
FIG. 7 is a flowchart illustrating a method for a server computer of a payment processing network or a server computer of an issuer to facilitate a payment transaction where a camera in a mobile communication device is used as a vehicle to identify a merchant access device 132.

FIG. 7 is a flowchart illustrating a method for server computer 152 of payment processing network 150 or server computer 162 of issuer 160 to facilitate a payment transaction where a camera in mobile communication device 120 is used as a vehicle to identify merchant access device 132.

In step S710, server computer receives an image from mobile communication device 120, location data of mobile communication device 120, and consumer account information. The various types of images, location data, and consumer account information have already been described in length, and all such previous descriptions are equally applicable herein. Further, various techniques for the server computer to receive such information have also been described in length, and all such previous descriptions are equally applicable herein.

In step S720, server computer identifies merchant access device 132 used for the transaction. As previously described, server computer may identify merchant access device using the received image.

In step S730, server computer obtains transaction information associated with the transaction. As previously described, server computer may obtain transaction information from a variety of entities. For example, server computer may obtain transaction information from mobile communication device 120. Alternatively, server computer may obtain transaction information from merchant 130 or merchant access device 132.

In step S740, server computer identifies a consumer account associated with the transaction. As previously described, server computer may identify a consumer account associated with the transaction using the received phone number of mobile communication device.

In step S750, server computer sends an authorization response message to merchant access device 132. As previously described, if the server computer is server computer 162 of issuer 160, server computer 162 may directly send the authorization response message to merchant access device 132 or may send the authorization response message to merchant access device 132 via payment processing network 150. Alternatively, if the server computer is server computer 152 of payment processing network 150, server computer 152 may send the authorization response message to merchant access device 132.

V. Computer Apparatuses

Figure 8:
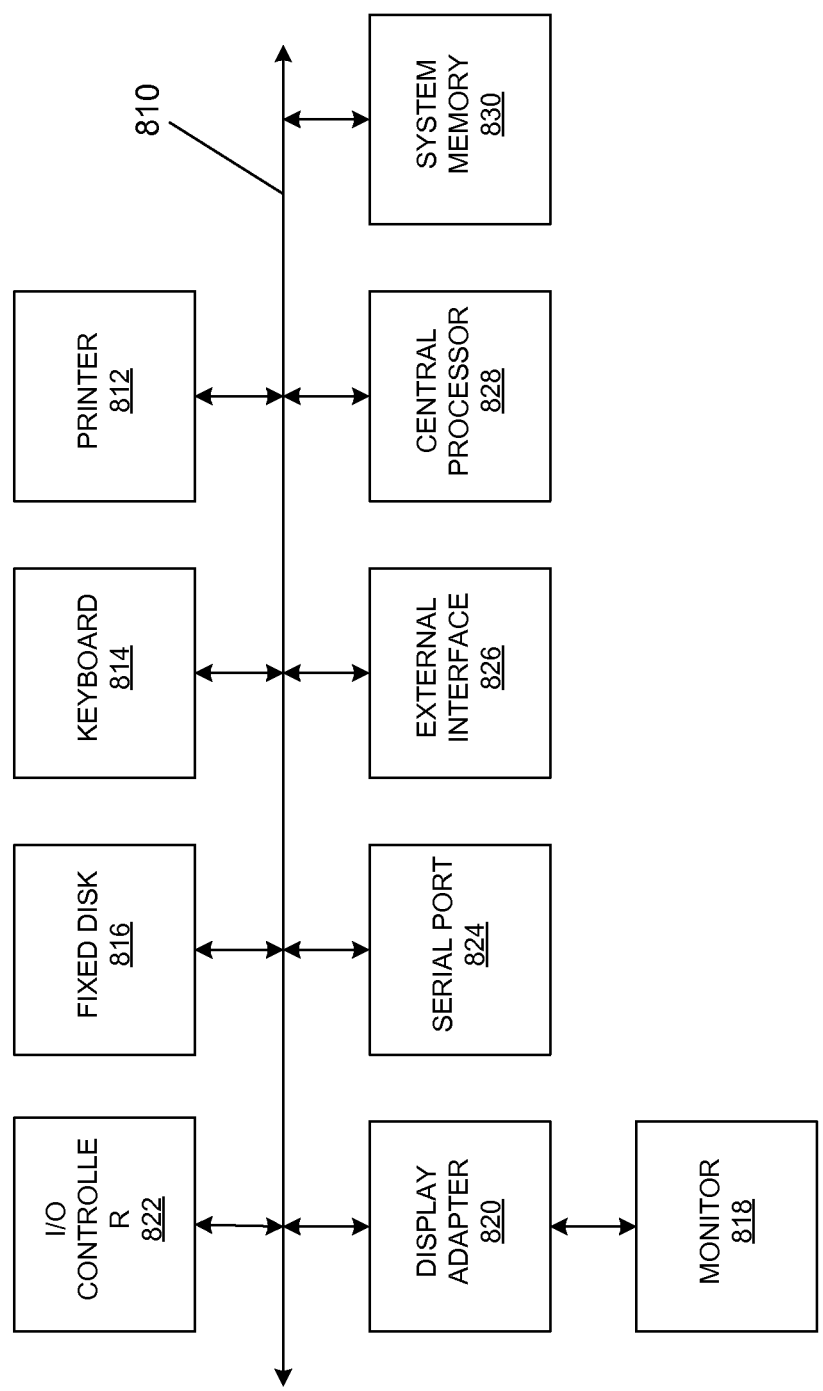
FIG. 8 is a block diagram of subsystems that may be present in computer apparatuses that are used in a system for conducting a payment transaction according to embodiments of the invention.

The various participants and elements of the system shown in FIG. 1 may operate one or more computer apparatuses to facilitate the functions described herein. Any of the elements in FIG. 1 may use any suitable number of subsystems to facilitate the functions described herein. Examples of such subsystems or components are shown in FIG. 8. The subsystems shown in FIG. 8 are interconnected via a system bus 810. Additional subsystems such as a printer 812, keyboard 814, fixed disk 816 (or other memory comprising CRM), monitor 818, which is coupled to display adapter 820, and others are shown. Peripherals and input/output (I/O) devices, which couple to I/O controller 822, can be connected to the computer system by any number of means known in the art, such as serial port 824. For example, serial port 824 or external interface 826 can be used to connect the computer apparatus to a wide area network such as the Internet, a mouse input device, or a scanner. The interconnection via system bus 810 allows central processor 828 to communicate with each subsystem and to control the execution of instructions from system memory 830 or fixed disk 816, as well as the exchange of information between subsystems. System memory 830 and/or fixed disk 816 may embody a CRM.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A server computer comprising a processor, a computer readable storage medium, and software stored on the computer readable storage medium, the software, when executed by the processor, causing the server computer to perform operations including:
   receiving, during a transaction between a consumer and a merchant performed via a merchant access device associated with the merchant, from a mobile communication device associated with the consumer and used by the consumer to facilitate the transaction between the consumer and the merchant, an image of the merchant access device, the image including structural elements of the merchant access device located outside of an electronic display of the merchant access device, the merchant access device being one of a plurality of different merchant access devices associated with the merchant;
   identifying the merchant access device from the plurality of merchant access devices associated with the merchant based on the structural elements of the merchant access device located outside of the electronic display of the merchant access device included in the received image by comparing the structural elements of the merchant access device in the received image with stored images to determine a matching image and a merchant access device identifier associated with the matching image; and
   causing an authorization response message to be sent to at least one of the merchant access device of the plurality of merchant access devices associated with the merchant and the mobile communication device associated with the consumer and used by the consumer to facilitate the transaction between the consumer and the merchant, wherein the authorization response message indicates whether or not the transaction is approved.

2. The server computer of claim 1, wherein the structural elements of the merchant access device located outside of the electronic display of the merchant access device include at least one of:
   a shape of the merchant access device;
   a color or arrangement of colors on the merchant access device; and
   an arrangement of elements provided on the merchant access device, wherein the elements include at least one of a keypad, a display, a magnetic strip card reader, a printer, a smart card reader, and an antenna.

3. The server computer of claim 1, wherein the structural elements of the merchant access device located outside of the electronic display of the merchant access device include a unique identifier associated with the merchant access device located outside of the electronic display of the merchant access device.

4. The server computer of claim 3, wherein the unique identifier is a serial number of the merchant access device.

5. The server computer of claim 1, wherein the software, when executed by the processor, causes the server computer to perform additional operations including:
   receiving, during the transaction between the consumer and the merchant, transaction information from at least one of the merchant access device and the mobile communication device; and
   receiving account information indicating an account associated with the consumer.

6. The server computer of claim 5, wherein the transaction information is received from the merchant access device.

7. The server computer of claim 5, wherein the transaction information is received from the mobile communication device.

8. The server computer of claim 7, wherein the transaction information is embedded in the image of the merchant access device received from the mobile communication device, and the software, when executed by the processor, causes the server computer to read the transaction information from the image.

9. The server computer of claim 7, wherein the transaction information is received separate from the image of the merchant access device.

10. The server computer of claim 1, wherein the software, when executed by the processor, causes the server computer to perform additional operations including:

receiving, during the transaction between the consumer and the merchant, location information indicating a location of the mobile communication device associated with the consumer and used by the consumer to facilitate the transaction between the consumer and the merchant, wherein the merchant access device is identified from the plurality of merchant access devices associated with the merchant further based on the location of the mobile communication device indicated in the received location information.

11. The method of claim 1, wherein the image includes only portions of the merchant access device, wherein the portions of the merchant access device exclude a display of the merchant access device.

12. The server computer of claim 1, wherein causing an authorization response message to be sent includes:
   determining whether to approve the transaction;
   generating an authorization response message; and
   sending the authorization response message to at least one of the merchant, the merchant access device of the plurality of merchant access devices associated with the merchant, and the mobile communication device associated with the consumer.

13. The server computer of claim 1, wherein causing an authorization response message to be sent further includes:
   generating an authorization request message based on the received transaction information and account information, the authorization request message requesting a third party entity to approve the transaction; and
   communicating the authorization request message to a computer server associated with the third party entity.

14. A method for facilitating a transaction between a consumer and a merchant, comprising:
   receiving during the transaction between the consumer and the merchant performed via a merchant access device associated with the merchant:
      an image of the merchant access device, the image including structural elements of the merchant access device located outside of an electronic display of the merchant access device, the merchant access device being one of a plurality of different merchant access devices associated with the merchant; and
      location information indicating a location of a mobile communication device associated with the consumer and used by the consumer to facilitate the transaction between the consumer and the merchant;
   identifying the merchant access device from the plurality of merchant access devices associated with the merchant based on at least one of:
      comparing the structural elements of the merchant access device in the received image with images stored in a database to determine a matching image, and locating a merchant access device identifier associated with the matching image, the merchant access device identifier identifying the merchant access device from the plurality of merchant access devices associated with the merchant; and
      comparing the received location information with locations stored in the database to determine a matching location, and locating the merchant access device identifier associated with the matching location, the merchant access device identifier identifying the merchant access device from the plurality of merchant access devices associated with the merchant; and
   causing an authorization response message to be sent to at least one of the merchant, the merchant access device of the plurality of merchant access devices associated with the merchant, and the mobile communication device associated with the consumer, wherein the authorization response message indicates whether or not the transaction is approved.

15. The method of claim 14, further comprising:
   identifying the merchant by performing steps including:
      comparing the received location information with locations stored in the database to determine the matching location; and
      locating a merchant identifier associated with the matching location;
   wherein the merchant access device is identified by performing steps including:
      comparing the received image with the images stored in the database to determine the matching image; and
      locating the merchant access device identifier associated with the matching image.

16. The method of claim 14, further comprising:
   receiving, during the transaction between the consumer and the merchant, transaction information from at least one of the merchant access device and the mobile communication device; and
   receiving account information indicating an account associated with the consumer.

17. The method of claim 16, wherein the account information includes at least one of an account number issued by an issuer, a number of a payment card issued by an issuer, an purely alphabetic sequence, a purely numeric sequence, an alphanumeric sequence, a name of the consumer, a name of an account, a dialing tone, a sequence of dialing tones, an image of the consumer, a fingerprint, an audio sequence, and a phone number.

18. The method of claim 16, further comprising:
   comparing the received account information with account information stored in a database to determine matching account information, the database having account information associated with consumer account identifiers, the consumer account identifiers identifying accounts issued by one or more issuers to consumer; and
   locating a consumer account identifier associated with the matching account information;
   wherein the authorization response message is caused to be sent based on the received transaction information and the consumer account identifier.

19. The method of claim 16, wherein the transaction information includes at least one of a list of the items in the transaction, a description of the items, item identifiers, prices of the items being purchased, the total number of items, the total amount of the transaction, and a transaction code that uniquely identifies the transaction.

20. The method of claim 16, wherein causing an authorization response message to be sent includes:
   generating an authorization request message based on the received transaction information and account information, the authorization request message requesting a third party entity to approve the transaction; and
   communicating the authorization request message to a computer server associated with the third party entity.

21. The method of claim 20, wherein causing an authorization response message to be sent further includes:
   receiving, from the third party entity and in response to communicating the authorization request message, an authorization response message, the authorization response message indicating whether or not the transaction is approved; and
   forwarding the authorization response message to at least one of the merchant, the merchant access device of the plurality of merchant access devices associated with the merchant, and the mobile communication device associated with the consumer.

22. The method of claim 16, wherein causing an authorization response message to be sent includes:
   determining whether to approve the transaction;
   generating an authorization response message; and
   sending the authorization response message to at least one of the merchant, the merchant access device of the plurality of merchant access devices associated with the merchant, and the mobile communication device associated with the consumer.

23. The method of claim 14, wherein before the transaction is initiated, images and geographical locations of the plurality of merchant access devices are stored in a merchant database.

24. The method of claim 14, wherein the structural elements of the merchant access device located outside of the electronic display of the merchant access device include at least one of:
   a shape of the merchant access device;
   a color or arrangement of colors on the merchant access device; and
   an arrangement of elements provided on the merchant access device, wherein the elements include at least one of a keypad, a display, a magnetic strip card reader, a printer, a smart card reader, and an antenna.

25. The method of claim 14, wherein the structural elements of the merchant access device located outside of the electronic display of the merchant access device include a unique identifier associated with the merchant access device located outside of the electronic display of the merchant access device.

26. The method of claim 14, wherein the location information includes a location input by the consumer into the mobile communication device.

27. A tangible non-transitory computer readable storage medium having instructions stored thereon that, when executed by a processor, cause at least one computer to perform operations including:
   receiving, during a transaction between a consumer and a merchant performed via a merchant access device associated with the merchant, location information indicating a location of a mobile communication device associated with the consumer and used by the consumer to facilitate the transaction between the consumer and the merchant;
   identifying the merchant access device from a plurality of merchant access devices associated with the merchant based on the location of the mobile communication device indicated in the received location information by comparing the received location information with locations stored in a database to determine a matching location, and locating a merchant access device identifier associated with the matching location, the merchant access device identifier identifying the merchant access device from the plurality of merchant access devices associated with the merchant;
   receiving, during the transaction between the consumer and the merchant, transaction information from the merchant access device; and
   causing an authorization response message to be sent to at least one of the merchant, the merchant access device of the plurality of merchant access devices associated with the merchant, and the mobile communication device associated with the consumer, wherein the authorization response message indicates whether or not the transaction is approved.

28. The computer readable storage medium of claim 27, wherein the location information includes at least one of global positioning system coordinates of the mobile communication device, a triangulated position of the mobile communication device, and a location input by the consumer into the mobile communication device.

29. The computer readable storage medium of claim 27, wherein the instructions, when executed by the processor, cause the at least one computer to perform additional operations including:
   receiving account information indicating an account associated with the consumer.

30. The computer readable storage medium of claim 29, wherein causing an authorization response message to be sent includes:
   generating an authorization request message based on the received transaction information and account information, the authorization request message requesting a third party entity to approve the transaction; and
   communicating the authorization request message to a computer server associated with the third party entity.

31. The computer readable storage medium of claim 30, wherein the authorization request message includes an account identifier and an amount of the transaction, and the authorization request message requests authorization of the transaction amount from a consumer account identified by the account identifier.

32. The computer readable storage medium of claim 31, wherein the authorization request further includes at least one of an identification of the merchant and an identification of the merchant access device.

33. The computer readable storage medium of claim 29, wherein the account information includes a user name and a PIN, and wherein the instructions, when executed by the processor, cause the at least one computer to perform additional operations including:
   verifying the PIN before allowing transmission of the location information.

34. The computer readable storage medium of claim 27, wherein the instructions, when executed by the processor, cause the at least one computer to perform additional operations including:
   identifying the merchant based on the location of the mobile communication device indicated in the received location information.

35. The computer readable storage medium of claim 27, wherein the instructions, when executed by the processor, cause the at least one computer to perform additional operations including:
   identifying the merchant based on:
      the location of the mobile communication device indicated in the received location information; and
      an image of the merchant access device received during the transaction between the consumer and the merchant.

36. The computer readable storage medium of claim 27, wherein the instructions, when executed by the processor, cause the at least one computer to perform additional operations including:
   receiving, during the transaction between the consumer and the merchant, an image of the merchant access device;
   wherein identifying the merchant access device from the plurality of merchant access devices associated with the merchant includes:

comparing the received location information with locations stored in the database to determine a matching location;
comparing the received image with images stored in the database to determine a matching image; and
locating the merchant access device identifier associated with both the matching location and the matching image.

* * * * *